(12) United States Patent
Glombitza

(10) Patent No.: US 8,727,614 B2
(45) Date of Patent: *May 20, 2014

(54) METHOD FOR MONITORING THE STATE OF A TUBE FOR A COATING IN A SYSTEM OF PIPES OR DUCTS

(76) Inventor: Ulrich Glombitza, Bergisch-Gladbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,393

(22) Filed: Feb. 23, 2012

(65) Prior Publication Data

US 2012/0147920 A1 Jun. 14, 2012

Related U.S. Application Data

(63) Continuation of application No. 12/206,515, filed on Sep. 8, 2008, now Pat. No. 8,162,535.

(30) Foreign Application Priority Data

Sep. 7, 2007 (DE) .......................... 10 2007 042 546

(51) Int. Cl.
*G01K 11/00* (2006.01)
*G01K 1/00* (2006.01)
*G01J 5/00* (2006.01)
*G01K 13/00* (2006.01)

(52) U.S. Cl.
USPC ........... 374/131; 374/161; 374/120; 374/141; 374/148

(58) Field of Classification Search
USPC ......................... 374/131, 161, 120, 141, 148
See application file for complete search history.

(56) References Cited

U.S. PATENT DOCUMENTS

| | | | |
|---|---|---|---|
| 4,687,677 A | 8/1987 | Jonasson et al. | |
| 5,124,151 A | 6/1992 | Viegas et al. | |
| 5,770,155 A * | 6/1998 | Dunphy et al. | 422/82.05 |
| 5,921,285 A | 7/1999 | Quigley et al. | |
| 6,004,639 A | 12/1999 | Quigley et al. | |
| 6,527,441 B1 | 3/2003 | Cranch et al. | |
| 6,547,435 B1 * | 4/2003 | Grosswig et al. | 374/137 |
| 6,644,848 B1 * | 11/2003 | Clayton et al. | 374/7 |
| 6,935,376 B1 | 8/2005 | Taylor et al. | |

(Continued)

FOREIGN PATENT DOCUMENTS

| | | |
|---|---|---|
| DE | 9318404 U1 | 2/1994 |
| DE | 19509129 | 8/1996 |

(Continued)

OTHER PUBLICATIONS

USPTO Applicant-Initiated Interview Summary, mailed Apr. 30, 2012, and Applicants' Supplemental Response to Non-Final Office Action dated Dec. 16, 2011, filed Apr. 30, 2012, for U.S. Appl. No. 13/085,963, filed Apr. 13, 2011, Titled: Method and Apparatus for Determining Proper Curing of Pipe Liners Using Distributed Temperature Sensing, Lindner et al.

*Primary Examiner* — Mirellys Jagan
(74) *Attorney, Agent, or Firm* — McGarry Bair PC

(57) ABSTRACT

A method for monitoring a status of a sleeve for lining a system of pipes or conduits, the sleeve being impregnated with a curable resin, includes the steps of providing the sleeve, disposing at least one fiber optic sensor in thermally conductive contact with the sleeve, and generating, using the at least one fiber optic sensor, a positionally resolved thermographic image representative of a temperature of the sleeve as a function of position and time.

18 Claims, 5 Drawing Sheets

(56) References Cited

U.S. PATENT DOCUMENTS

| | | | |
|---|---|---|---|
| 7,315,666 B2 * | 1/2008 | Van Der Spek | 385/12 |
| 7,509,008 B2 * | 3/2009 | Perales et al. | 385/100 |
| 8,005,324 B2 * | 8/2011 | Bremnes | 385/12 |
| 2001/0026362 A1 * | 10/2001 | Gleine et al. | 356/32 |
| 2002/0033554 A1 | 3/2002 | Heagy et al. | |
| 2002/0172410 A1 | 11/2002 | Shepard | |
| 2003/0174924 A1 * | 9/2003 | Tennyson | 385/12 |
| 2005/0025448 A1 | 2/2005 | Hewak et al. | |
| 2005/0274425 A1 | 12/2005 | Ostrander et al. | |
| 2006/0016502 A1 | 1/2006 | Lund et al. | |
| 2006/0151656 A1 * | 7/2006 | Gallagher et al. | 242/437 |
| 2007/0081773 A1 * | 4/2007 | Pizzorno et al. | 385/100 |
| 2007/0165691 A1 * | 7/2007 | Taverner et al. | 374/120 |
| 2007/0171402 A1 * | 7/2007 | Watley et al. | 356/73.1 |
| 2007/0286561 A1 * | 12/2007 | Poland et al. | 385/126 |
| 2008/0018903 A1 * | 1/2008 | Bao et al. | 356/477 |
| 2008/0181554 A1 * | 7/2008 | Taverner et al. | 385/12 |
| 2009/0067795 A1 | 3/2009 | DiGiovanni et al. | |
| 2009/0169364 A1 | 7/2009 | Downton | |
| 2009/0279583 A1 * | 11/2009 | Hampson et al. | 374/131 |
| 2009/0308475 A1 * | 12/2009 | Stringfellow et al. | 138/98 |
| 2010/0229662 A1 | 9/2010 | Brower | |
| 2010/0254650 A1 * | 10/2010 | Rambow | 385/13 |
| 2010/0269941 A1 | 10/2010 | Hara | |
| 2011/0186203 A1 * | 8/2011 | Lindner et al. | 156/64 |
| 2011/0280280 A1 * | 11/2011 | Kochergin | 374/161 |
| 2012/0261050 A1 * | 10/2012 | Lindner et al. | 156/64 |
| 2013/0034324 A1 * | 2/2013 | Laing et al. | 385/13 |

FOREIGN PATENT DOCUMENTS

| | | |
|---|---|---|
| DE | 29623263 | 6/1998 |
| DE | 19817413 | 10/1999 |
| DE | 19826155 | 2/2000 |
| DE | 19844753 A1 | 2/2000 |
| DE | 20005871 | 8/2000 |
| DE | 19950880 | 6/2001 |
| DE | 10122565 | 11/2002 |
| DE | 10338522 | 5/2004 |
| EP | 0122246 | 10/1984 |
| EP | 0555846 A2 | 8/1993 |
| EP | 0712352 | 5/1996 |
| EP | 1262708 | 12/2002 |
| JP | 04077624 A | 3/1992 |
| WO | 9610735 | 4/1996 |
| WO | 2004015349 | 2/2004 |
| WO | 2006061129 | 6/2006 |

* cited by examiner

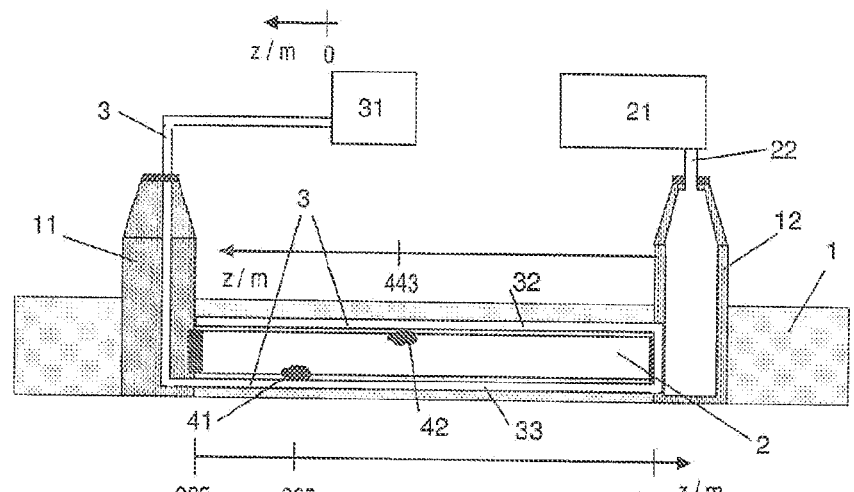
Fig. 1a
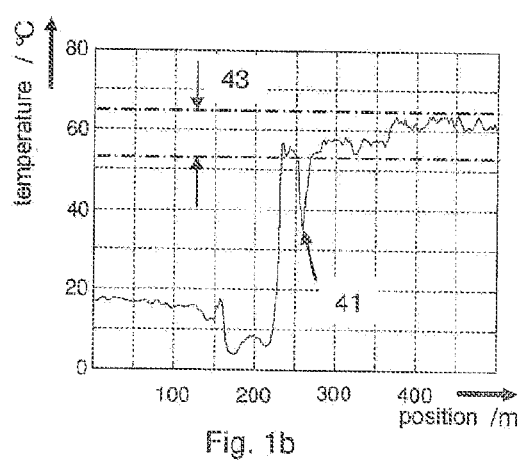
Fig. 1b
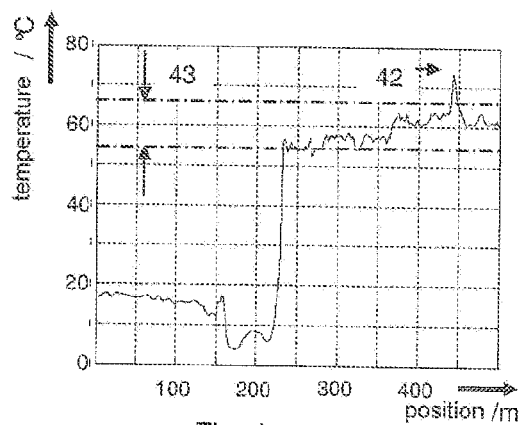
Fig. 1c
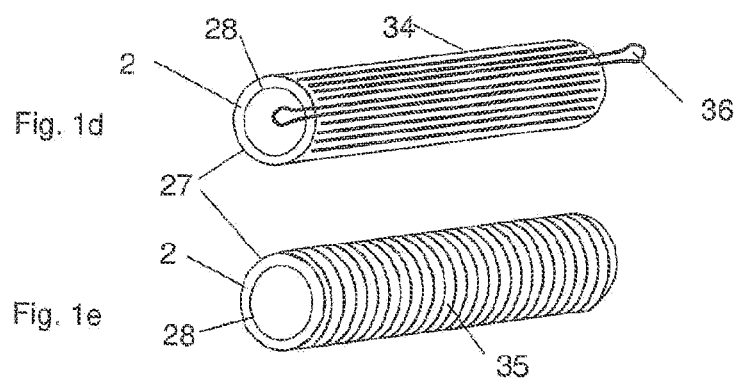
Fig. 1d
Fig. 1e
Fig. 1

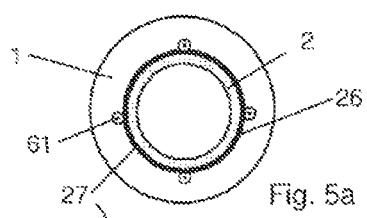
Fig. 5a
Fig. 5b
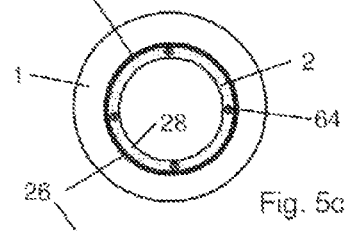
Fig. 5c
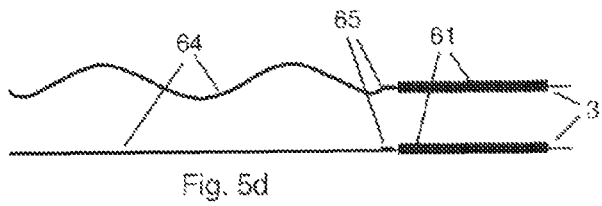
Fig. 5d
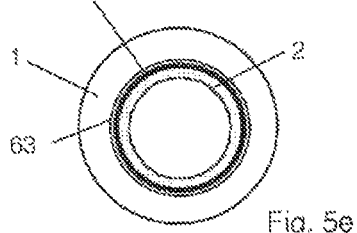
Fig. 5e
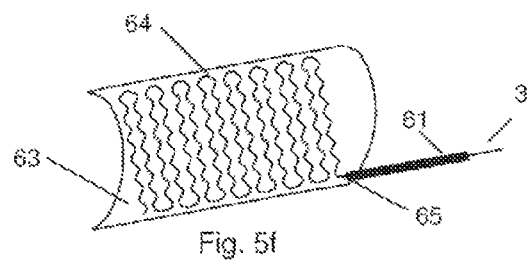
Fig. 5f
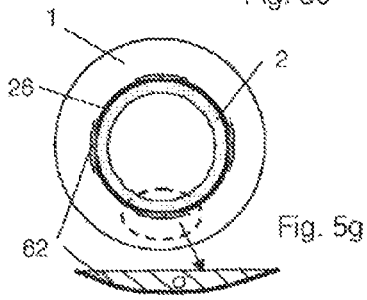
Fig. 5g
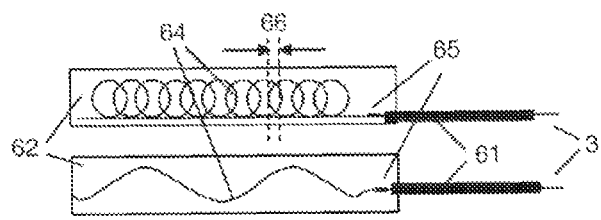
Fig. 5h
Fig. 5

METHOD FOR MONITORING THE STATE OF A TUBE FOR A COATING IN A SYSTEM OF PIPES OR DUCTS

CROSS-REFERENCE TO RELATED APPLICATION(S)

This application is a continuation of U.S. patent application Ser. No. 12/206,515, filed Sep. 8, 2008, now U.S. Pat. No. 8,162,535, issued Apr. 24, 2010, which claims the benefit of German Patent Application No. DE102007042546.7, filed Sep. 7, 2007, both of which are incorporated herein by reference in their entirety.

BACKGROUND

The present invention relates to a method and system for monitoring the status of a sleeve for a lining in a pipe system or conduit system.

BRIEF SUMMARY

It is an aspect of the present invention to provide a method for monitoring a sleeve for a lining of a pipe system or conduit system, which method is performable over a long period of time, measurements being possible at one point in time and/or in arbitrarily repeatable fashion over time.

According to the invention, a method for monitoring a status of a sleeve lining in a pipe or conduit, wherein the sleeve comprises a curable resin, comprises the steps of disposing a fiber optic distributed temperature sensing system in thermally conductive contact with the sleeve, wherein the fiber optic sensing system is configured for positionally resolved, distributed temperature sensing to measure the temperature of the sleeve along the length thereof as a contiuous profile; curing the curable resin over a period of time; during the curing act, generating, using the fiber optic sensing system, positional and time-related measured data of the temperature thereof. The act of generating positional and time-related measured data is performed using the fiber optic distributed temperature sensing system.

In one embodiment, the act of generating positional and time-related measured data is reiterated during the curing act.

In another embodiment, the act of generating positional and time-related measured data of the temperature of the sleeve is repeated through operating period of the sleeve.

In another embodiment, the curing quality of the sleeve is verified along length of the sleeve following the act of generating positional and time-related measured data of the temperature of the sleeve.

In another embodiment, the positional and time-related measured data of the temperature of the sleeve can be recorded. Further, the positional and time-related measured data of the temperature of the sleeve can be depicted. In addition, the depiction can represent positional and time-related measured data of the temperature at a positional resolution below 1 m. Further, the depiction of the positional and time-related measured data can represent selected positions along the sleeve. In addition, the depiction of the positional and time-related measured data along the sleeve can be a function of time. In a preferred embodiment, the depiction of the positional and time-related measured data can be a 3-dimensional representation.

In another embodiment, the positional and time-related data can be correlated with a thermal model of the curable resin as a function of the degree of curing.

In yet another embodiment, the positional and time-related measured data can be used to control the energy for the curing process.

Further according to the invention, a system configured to monitor a status of a curable resin sleeve lining in a pipe or conduit comprises: a fiber optic distributed temperature sensing system disposed in thermally conductive contact with the sleeve. The fiber optic sensing system is configured for positionally resolved, distributed temperature measurement of the sleeve along the length thereof as a continuous profile. A thermal energy source or a light source is coupled to the pipe or conduit for curing the curable resin over a period of time and an evaluation apparatus is coupled to the fiber optic sensing system and configured to generate, using the fiber optic sensing system, positional and time-related measured data representative of a temperature of the sleeve as a function of linear position along the length thereof and over a period of time. The fiber optic sensing system can include at least one optical waveguide.

In one embodiment, the linear positions can have a resolution of about 0.5 m to about 1 m along the length of the sleeve.

In one embodiment, the fiber optic sensor arrangement can include a multimode optical fiber.

In another embodiment, the at least one optical waveguide can be embodied as an optical waveguide sensor cable.

BRIEF DESCRIPTION OF THE DRAWINGS

The present invention will be explained in further detail below with reference to several exemplifying embodiments in the Figures, in which:

FIG. 1 schematically shows an arrangement for fiber optic temperature measurement during conduit rehabilitation using the sleeve lining method;

FIG. 1a schematically depicts the positional situation

FIG. 1b is a curve for temperature as a function of fiber location, with an irregularity in the base region of the liner;

FIG. 1c is a curve for temperature as a function of fiber location, with an irregularity in the peak region of the liner;

FIG. 1d shows OWG sensor arrangements in the longitudinal direction of the liner;

FIG. 1e shows OWG sensor arrangements in the transverse direction of the liner;

FIG. 3 shows explanations regarding liner quality

FIG. 5 schematically depicts arrangements and embodiments of the OWG sensor;

FIG. 5a shows examples of sensor cable arrangements between the old pipe and the liner/slip film;

FIG. 5b shows examples of embodiments of the OWG sensor, with reference to FIG. 5a;

FIG. 5c shows examples of sensor fiber arrangements inside the liner;

FIG. 5d shows examples of embodiments of the OWG sensor, with reference to FIG. 5c;

FIG. 5e shows an example of a sensor mat arrangement with a radial installation direction between the old pipe and the preliner/slip film;

FIG. 5f shows an example of a sensor mat embodiment, with reference to FIG. 5e;

FIG. 5g shows an example of a sensor mat arrangement with a longitudinally oriented installation direction between the old pipe and the preliner/slip film;

FIG. 5h shows examples of sensor mat embodiments, with reference to FIG. 5g.

DETAILED DESCRIPTION

Figure 2:
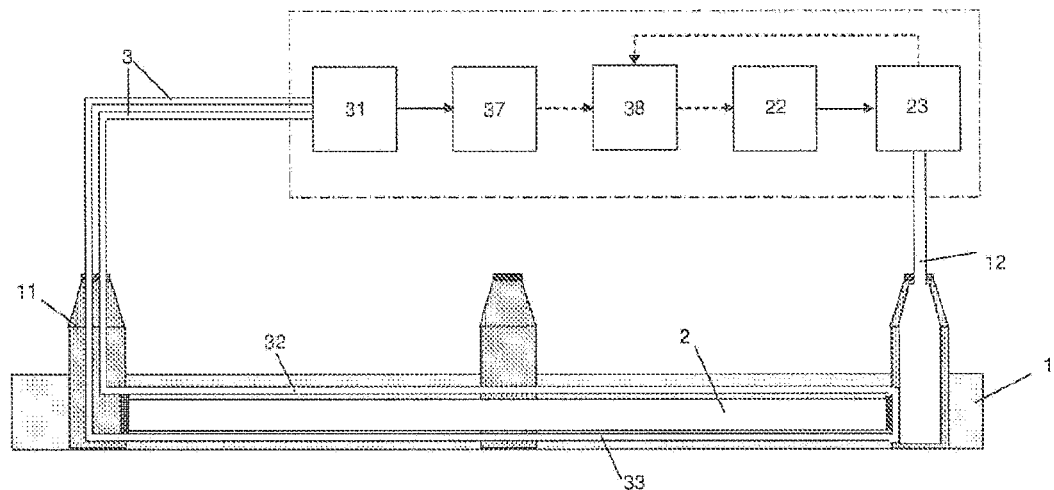
FIG. 2 schematically depicts the process control apparatus for liner curing.

The individual method steps according to an embodiment of the present invention include:

producing a preferably glass-fiber-reinforced sleeve impregnated with curable resin;

bringing at least one fiber optic sensor into thermally conductive contact with the sleeve; and preparing a positionally resolved thermographic image of the temperature of the sleeve as a function of position and time, by means of a positionally resolving fiber optic temperature sensor apparatus.

The fact that thermally conductive contact is brought about produces an arrangement of a positionally distributed temperature sensor that enables an (almost) uninterrupted measurement of the surface temperature distribution of the sleeve in the form of a positionally resolved thermographic image as a function of location and time. Measurements can be repeated over time, beginning with production (of the not-yet-cured sleeve, and transport and storage thereof), installation (curing performed during installation) in a system, through the operating period, to later repair of the liner converted by curing.

With the aid of the spatial thermographic image (hereinafter a "temperature image"), the curing process of the sleeve can be monitored in situ and can be made available to a process management system. After they are produced, sleeves are preferably stored so that they are not exposed to light and/or heat. Many manufacturers also effect cooling of the sleeves until they are installed. If a fiber optic sensor is already brought during this phase into thermally conductive contact with a sleeve, temperature monitoring can be begun in, so to speak, uninterrupted fashion from the moment of manufacture.

Upon the occurrence of unforeseeable heat evolution events inside and outside the sleeve, process parameters can be controlled, modified, and/or adapted by way of the process management system. Process management can be further optimized by incorporating a thermal model regarding the thermal environment properties of the sleeve.

The present invention includes a testing method with which, on the basis of the temperature image, measured values can be furnished that enable an evaluation of the quality of the drainage system (hydraulics, material strength, and impermeability of the liner). By way of the testing method, which is continuously repeatable over time, a verification of correct installation (rehabilitation) can be effected at any time.

The use of, for example, fiber optic Raman temperature sensors enables positionally resolved, distributed temperature measurement along an optical fiber segment up to several kilometers in length. The positional resolution achievable is between 0.5 m and 1 m; temperature accuracy is <1 K, and depends on measurement time and measurement location (range). A positional resolution of, for example, 1 m means that indicated value corresponds to the average temperature value of a piece of fiber 1 m long. In other words, temperature events that occur within a portion of that length cannot be separated and measured exactly.

Figure 4:
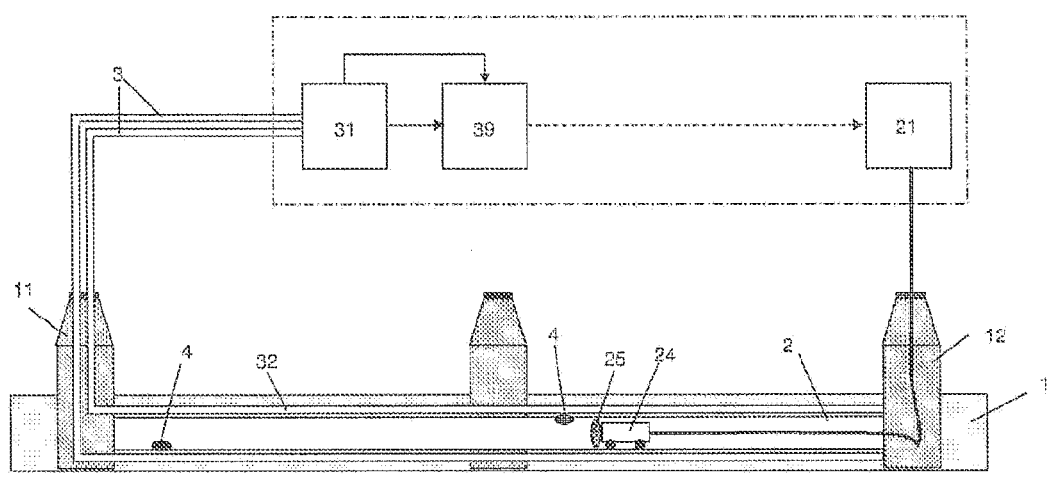
FIG. 4 schematically depicts the apparatus for positioning the grinding robot.

FIG. 1 shows a schematic arrangement of a lined conduit. A depiction of the temperature profile over time and space can advantageously be used a) to monitor process control in terms of homogeneous curing of the liner (see FIG. 2);

b) to draw conclusions as to curing quality along the liner (see FIG. 3);

c) for exact localization of defect sites, for example in order to position grinding robots to take samples (see FIG. 4).

Discussions Follow Below Regarding d) arrangements and embodiments for optical waveguide (OWG) sensors (see FIG. 5);

e) further uses (synergies) of the arrangements and embodiments of the OWG sensors in the pipe and conduit sector, for fiber-optic-based (e1) leak detection;

(e2) liquid level measurement; and (e3) thermal image measurement.

Explanations Regarding (a) Process Management for Curing

Utilizing a dynamic thermal model, the temperature for optimum curing at any point on the liner can be calculated. The dynamic thermal model is based on a knowledge of the thermal resistance values of the liner resin as a function of the degree of curing (which values are known from laboratory experiments), and on a knowledge of the thermal resistance values of the measurement arrangement used (sensor cable, preliner, slip film, old pipe, soil, etc.). The mathematical model is designed so that with the aid of an equivalent thermal image, in consideration of the thermal energy delivered and the thermal resistance values, the resulting heat losses along the liner can be calculated. Based on the heat losses, the expected curing temperature in both the transverse and the longitudinal direction of the liner can be ascertained. This result is compared with the positional temperature distribution of the OWG sensors, so that conclusions as to local irregularities are possible. For example, if a local heat sink exists because of external water, the increase in thermal energy can be back-calculated with the aid of the model in order to compensate for the heat loss during curing. This method is comparable with the real time temperature rating (RTTR) method that is used to calculate the thermal loads of energy cables.

In order to take into account the current (time-related) degree of curing during measurement for a calculation of the thermal resistance values of the liner resin, the temperature measurement system preferably records the positional and time-related temperature profile of the measurement locations. A depiction of the temperature values as a function of measurement location and measurement repetition time is the temperature image.

Explanations Regarding (b) Curing Quality

The temperature image further makes possible statements regarding the quality state along the liner. The measured profile over time can be compared, by software processing, with the predicted profile over time. The comparison shows whether there are locations along the liner whose curing temperature lies outside a predefined tolerance band.

Explanations Regarding (c) Localization of Defect Sites

In the event of deficient liner quality, it is of interest to take samples. TV-controlled mobile grinding robots, which are displaced in the longitudinal direction of the conduit (liner), are generally used for sample removal. The coordinates for positioning the robot and those of the layout arrangement of the OWG sensors are generally different, so that they are preferably coordinated with one another. Calibration of the sensor cable at known OWG sensor locations allows an allocation to the measurement segment. In order to achieve more exact, more accurate positioning of the grinding robot in the region of the damage site, a heat source (e.g. infrared radiator) is installed on the grinding robot; this induces a local heating in the sensors and produces a hot spot in the positional temperature curve (see FIG. 4). The grinding robot is controlled so that the hot spot moves toward the temperature point where the damage site was identified. When the two temperature locations agree, the sample can be taken.

Explanations Regarding (d) OWG Sensors

The disposition of OWG sensors (fibers or loose tubes or cables) take account of the different temperature evolutions during curing (longitudinal and transverse arrangement of OWG sensors) and the geometrical dimensions of the liner.

Example 1

For heat-curing sleeves, the OWG sensors are preferably laid out on the longitudinal axis of the inliner sleeve; for a pipe length of 100 m and a positional resolution of 1 m per horizontal sensor arrangement, 100 temperature measurement points are therefore obtained.

For heat-curing methods, the OWG sensors are preferably positioned in the region of the peak (12 o'clock position) and base (6 o'clock position) in order to cover the temperature tolerance band of the curing process. With steam methods, the temperature in the base region experiences somewhat greater cooling, due to the formation of condensation, than in the peak region. With water methods, hot water is transported during the heating process through hoses from the supply vehicle to the liner. Spatial temperature layers occur, in both the longitudinal and the transverse direction of the liner, as the hot water flows in. The water layers that form are somewhat warmer in the peak region than in the base region.

Example 2

A longitudinal arrangement can be selected for light-curing sleeves as well. A transverse arrangement of OWG sensors offers the capability of increasing the density of measurement points in the region where the light chain has a thermal effect. For a pipe diameter of 1 m, the sensor cable length is 3.14 m per circumference. With an average turn spacing of 25 cm and a pipe length of 100 m, approximately 400 turns with a total OWG length of 1250 m can be installed. The user thus has more than a thousand measurement points available for controlling the curing process.

An OWG sensor can be embodied as a sensor cable, sensor fiber, or sensor mat. The structure of the sensor cable is usually made up of a sheathed loose tube (stainless-steel or plastic tube) having at least one integrated OWG sensor fiber. The diameter of the sensor cable is typically 4 to 5 mm. As a result of the loose tube construction, sensor cables have a relatively high rigidity that makes installation onto small surfaces difficult or impossible. For this reason, the OWG sensor cable (see FIG. 5b) is preferably positioned between the old pipe and the preliner/slip film (see FIG. 5a) or between the preliner/slip film and the liner.

When an OWG sensor is integrated into the preliner/slip film or directly into the liner (see FIG. 5c), an OWG loose tube having a small diameter (between 0.8 mm and 2 mm) and with a built-in fiber or an OWG fiber (see FIG. 5d) is preferable. Because the OWG sensor elements in the liner are exposed to large mechanical compressive and tensile forces during rehabilitation, a suitable type of OWG that is insensitive to microcurvature is preferable. So-called multimode fibers, having a large core diameter (62.5 .mu.m and larger) and a large jacket diameter (500 .mu.m), are preferred. The OWG fiber can be given additional mechanical protection with a loose tube (made e.g. of plastic or stainless steel), with the advantage of compensating for thermal material expansion of the OWG fiber with respect to its environment. In order to ensure good mechanical protection during the rehabilitation operation, the OWG fiber is connected to a robust OWG sensor cable using a splice connection.

A further embodiment of an OWG sensor is an OWG sensor mat (see FIGS. 5f and 5h). The sensor mat concept enables integration of the OWG sensor fiber into a glass-fiber textile with good mechanical protection, and installation between the old pipe and the preliner or slip film (see FIGS. 5e and 5g). In addition, with an OWG sensor mat, an additional length of the OWG sensors a) can be introduced in a circumferential direction (see FIG. 5f) in order to increase positional accuracy in the transverse direction of the liner;

b) introduced in a horizontal direction (see FIG. 5i) in order to increase positional accuracy in the longitudinal direction of the liner.

In order to meet mechanical requirements when the sensor mat is installed between an old pipe and a preliner or slip film, the sensor mat includes a hard underlayer facing toward the old pipe, and a soft upper layer facing toward the preliner or slip film.

The sensor mat is preferably fabricated using a type of OWG that is insensitive to microcurvature, so that when the OWG sensor fiber is embedded into the composite material (direct embedding or in combination with a loose tube), the additional losses remain tolerable and correctable. To ensure good mechanical protection, the OWG fiber is attached to a robust OWG sensor cable using a splice connection (see FIGS. 5f and 5h).

With walkable conduits, the possibility exists of mounting the OWG sensor (sensor cable, sensor fiber, or sensor mat) on the old pipe.

Explanations Regarding (e1) Leak Detection

When conduits are rehabilitated, unsealed sites can occur that can cause a washout beneath the conduit. These leaks are undesirable, and are difficult to localize.

The water flowing through the conduit generally has a higher temperature than the outside temperature of the inliner sleeve, and a higher temperature than groundwater temperature. The positional temperature profile in the longitudinal direction of the conduit is almost constant (only a small positional temperature gradient). At a leak, the conduit water flows through the sheathing to the base of the inliner sleeve. If the sensor cable is mounted below the inliner sleeve (6 o'clock position, between the concrete pipe and inliner sleeve, see FIG. 2), it is possible to locate leaks by temperature measurement. Leaks cause a local deviation in the positional temperature gradient, so that these unsealed sites can be localized.

Explanations Regarding (e2) Liquid Level Measurement

A variety of methods are used in the waste water sector to measure water level. The greatest problem is that contaminants yield inaccurate and defective readings.

A sensor mat concept (see FIGS. 5f and 5h), as well as horizontal OWG sensor arrangements (see FIG. 1d), can be used for liquid level measurement in the conduit. By evaluating the positional temperature values, the water height can be ascertained based on the differing temperatures of the flowing medium and air. The advantages of the OWG technique include:

no risk of explosion, since the sensor is passive;

no need to supply power;

little change in cross section when installed at a later date;

planar measurement distribution, therefore insensitive to corrugations;

multiple measurements possible with one cable.

Explanations Regarding (e3) Temperature Image Measurement

Every day, large quantities of waste water are transported through waste water conduit systems, purified in treatment plants, and then introduced into drainage outfalls. This represents essentially a waste product with no economic value. The waste water from residences and from agricultural and industrial operations not only carries off hazardous substances, however, but also causes heating of the water. The waste water that flows off is therefore at a higher temperature than, for example, drinking water.

There is increasing interest in utilizing this energy potential of waste water to provide heat, i.e. to heat premises and provide them with hot water. The input of heated water is not constant, but is dependent on many factors (time of year, work schedules, productivity levels, inflows and outflows). Optimization of the heat exchange process typically utilizes an in situ measurement of water heating. The OWG sensor arrangements and embodiments according to the present invention are suitable for measuring temperature distribution in the waste water conduit.

Further features of the present invention are recited below. The features can be implemented individually or together The fiber optic sensor can be introduced as an OWG sensor cable.

The fiber optic sensor is preferably introduced in a mat, the planar introduction being accomplished in a meander shape. The loops of the meander can be introduced parallel to the longitudinal extension of the mat, or perpendicular to the longitudinal extension of the mat.

The positionally resolved image of temperature as a function of location and time (hereinafter referred to simply as a "temperature image") is created during installation (during the curing operation) of the sleeve or lining. The delivery of energy (light and/or heat) to the lining is monitored during curing. Supervision and monitoring of the curing process occur.

The temperature image can be brought into correlation with a thermal model of the system. The temperature image can further be brought into correlation with a definable temperature tolerance band. Based on the temperature image, local deviations between measured and predicted curing temperatures can be identified The local deviations identified can be used to control a robot that is displaced along the lined pipe or conduit system, for example for the removal of samples.

For performance of the measurement method, the at least one fiber optic sensor is preferably introduced between the lining and the old pipe.

At least one optical waveguide sensor cable, or an optical waveguide sensor mat, is then located between the liner and the old pipe. The sensor mat preferably includes a plastic or glass-fiber textile having a hard underside (on the inside, toward the conduit) and a soft upper side (on the outside, toward the old pipe), into which the optical waveguide sensor fiber is introduced directly or in combination with a loose tube.

Alternatively to the embodiment recited, the at least one fiber optic sensor can be located on the old pipe, or inside a preliner or a slip film or a liner.

A factor for controlling the process parameters for the action of heat on the liner is whether the OWG sensor is positioned or introduced on the inner side of the lining (toward the center of the conduit) or on the outer side (toward the old pipe). Temperature differences of 5 to 10 K between inside and outside can easily occur due to the relatively low thermal conductivity of a glass-fiber-reinforced sleeve, or as a result of contact externally with the old pipe and the heat dissipation associated therewith.

The fiber optic temperature sensor apparatus can be used for positionally resolved water level measurement in pipe and conduit systems, and to measure waste water temperature.

The fiber optic temperature sensor apparatus that is used can be used in the form of a Raman temperature sensor apparatus.

FIG. 1 schematically shows the arrangements for measuring curing status during conduit rehabilitation, utilizing fiber optic temperature measurement. FIG. 1a shows a liner 2 installed in conduit 1. Thermal energy 22 for curing of the liner is delivered from supply vehicle 21 through shaft 12. Sensor cable 3, on the other hand, was installed from the oppositely located shaft 11. The example depicted shows a sensor arrangement in the form of a stub line. The optical measurement signal is generated in evaluation device 31 (optical backscatter measurement device) and coupled into the sensor cable (optical waveguide, OWG). The light backscattered out of the OWG can be used in known fashion for positionally distributed temperature measurement. The sensor cable is arranged so that the positional temperature graph (FIG. 1b and FIG. 1c) of the individual measurement represents the temperature along the OWG supply lead (up to approx. the 150 m location point) and along the shaft region (between 150 m and 365 m), and the temperature distribution along the base region (between 235 m and 365 m) and the peak region (between 365 m and 495 m) of the liner. The permissible temperature tolerance band 43 for the curing process of the particular formulation can be implemented in the software-based evaluation and presentation of the positional temperature curves, so that irregularities can be recognized, assessed, and localized. Irregularities resulting from, for example, local inflows of outside water 41 or local overheating spots 42 are depicted in the measured temperature curves of FIG. 1b and FIG. 1c FIG. 1d shows a sensor arrangement in which OWG sensor 3 is positioned in a horizontal direction with respect to the liner in order to achieve a high measurement density in the longitudinal direction of the liner. At each end of liner 2, the OWG is turned back in the form of loops 36. Longitudinal arrangements of OWG sensor 34 are preferably used for heat-curing liners. FIG. 1e shows a sensor arrangement in which OWG sensor 3 is positioned in a circumferential direction with respect to the liner in order to achieve a high measurement density in transverse direction 35 of the liner. Transverse arrangements of OWG sensor 35 are preferably used for light-curing liners.

FIG. 2 shows an apparatus for controlling the liner curing process, in combination with a fiber optic temperature measurement using a thermal model. Sensor cable 3 is installed over two reaches (three shafts) each having a stub line for the peak region 32 and a stub line for base region 33 of liner 2. Based on the positional and time-related measured temperature data of the OWG sensor (thermographic image 37), evaluation device 31 calculates the present thermal resistance of the liner resin. These data are made available, together with the thermal energy being (at present) delivered, to a thermal model 38 for further calculation. The thermal energy delivered can be ascertained, for example (indirectly) from process parameters 23 of the thermal energy supply system or (directly) by measuring the process temperature. The input of thermal energy 22 is raised or lowered in accordance with the result of the dynamic thermal model.

Figure 3A:
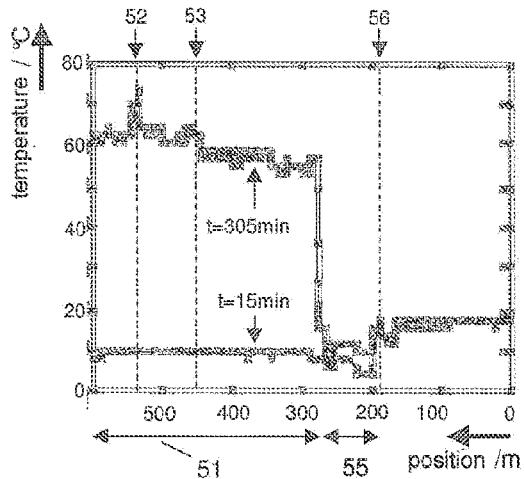
FIG. 3a is a positional temperature curve at measurement time t.
Figure 3B:
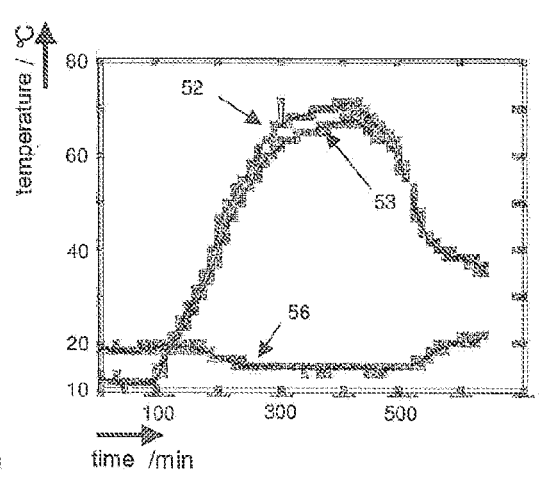
FIG. 3b is a curve for temperature over time at selected measurement locations.
Figure 3C:
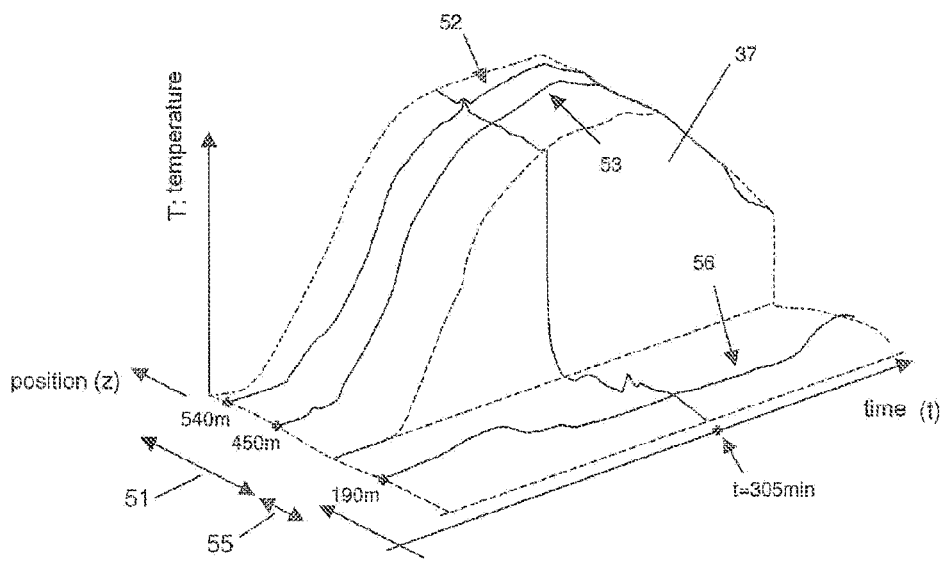
FIG. 3c schematically depicts a thermographic image with reference to FIGS. 3a and 3b.

FIG. 3 is intended to elucidate correlations with regard to statements about liner quality. The graphs of FIGS. 3a to 3c refer to the schematic arrangement of FIG. 1a, and show the temperature profile during curing of a liner in various presentation forms. FIG. 3a represents, inter alia, the positional temperature profile in shaft region 55 and in conduit region 51 at a specific measurement time (t=305 min with respect to measurement start). The time profiles of the positional points (52, 53, and 56) marked in FIG. 3a are depicted in FIG. 3b over the entire measurement time period (600 min). The region of the liner at positional point 52 shows a time-related irregularity in the form of a short-term elevation at measurement time t=305 min. No irregularity exists at positional point 53, but a lower curing temperature is achieved at this site than at site 52. Temperature profile 56 over time shows only the ambient temperature in accordance with prevailing weather conditions (diurnal profile) at the shaft inlet. FIG. 3c represents the capability for a thermographic depiction of the temperature profile as a function of position and time.

FIG. 4 refers to the problem of taking samples using a grinding robot, and shows an apparatus for positioning a grinding robot. When quality defects 4 on the liner are identified, a sample is taken from liner 2 using a grinding robot 24. Positioning of the grinding robot is performed, for example, from supply vehicle 21. In order to achieve the most exact positioning possible, the grinding robot possesses a heat source 25. The distance of the temperature location of heat source 25 from the temperature location of the damage site can be calculated using software. Based on the result of a coordinate adjustment 39, the grinding robot is repositioned until the exact site for taking a sample is found.

FIGS. 5a to 5h show examples, in the form of schematic depictions, of various arrangements and embodiments of the OWG sensor for use in pipe and conduit systems utilizing sleeve-lining methods.

The OWG sensor can be embodied as an OWG sensor cable 61 (see FIG. 5b), as an OWG sensor fiber 64 (see FIG. 5d), or as an OWG sensor mat 62, 63 (see FIGS. 5f and 5h). The OWG sensor is arranged depending on the configuration of the conduit and whether it is walkable. OWG sensor cable 61 is preferably positioned between old pipe/conduit 1 and preliner/slip film 26 (see FIG. 5a); OWG sensor fiber 64, on the other hand, is suitable for integration into liner 2 (see FIG. 5c), and OWG sensor mat 62, 63 is preferably installed between the old pipe and the preliner/slip film (see FIGS. 5e and 5g). For walkable conduits, all the OWG sensor versions can be mounted on the old pipe. The sensor mat concept allows the positional accuracy of the sensor measurement system to be increased by introducing, based on a selectable length ratio 66, an additional length of OWG sensor cable in the longitudinal direction of the liner (see FIG. 5h) or in the transverse direction (see FIG. 5f). In order to ensure good mechanical protection during the rehabilitation operation, OWG sensor fiber 64 is attached to a robust OWG sensor cable 61 using a splice connection 65.

Figure 6:
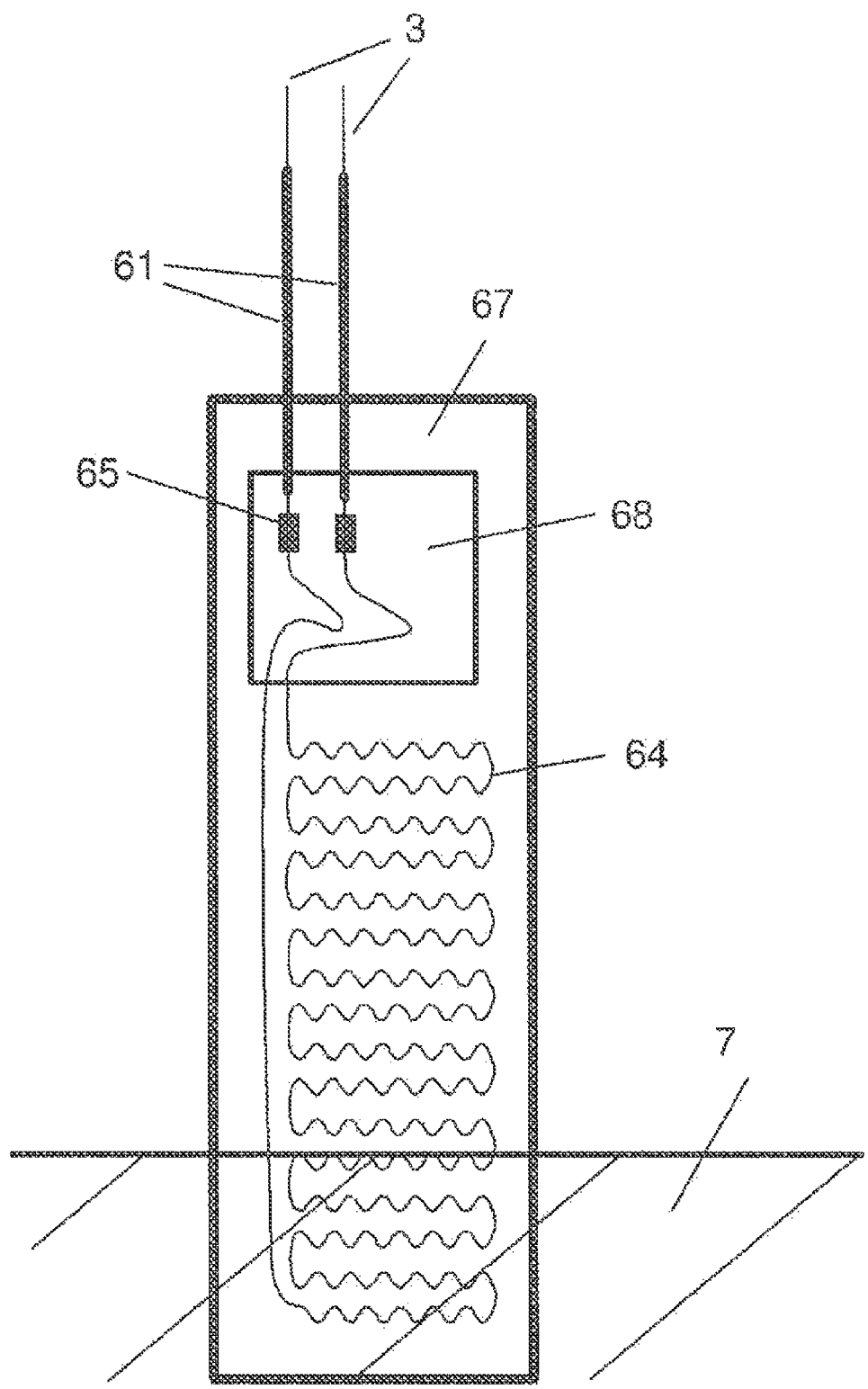
FIG. 6 shows OWG sensor mat embodiments for water level measurement.

FIG. 6 shows an example of a sensor mat embodiment having a boot 67 for liquid level measurement in the shaft region. In order to increase positional accuracy in the vertical direction (water level direction), OWG fiber 64 is arranged in a meander shape. The sensor mat contains a splice cassette 68 to enable easy and rapid installation in the conduit. To ensure good mechanical protection, OWG sensor fiber 64 is attached to a robust OWG sensor cable 61 using a splice connection 65.

The present invention is not limited to the embodiments described herein; reference should be had to the appended claims.

SUMMARY OF REFERENCES IN THE FIGURES

1 Conduit
11 Shaft A
12 Shaft B
2 Liner
21 Supply vehicle
22 Input of thermal energy
23 Process parameters
24 Grinding robot
25 Heat source
26 Preliner/slip film
27 Outer side of liner
28 Inner side of liner
3 OWG sensor
31 Fiber-optic evaluation device
32 OWG in peak region
33 OWG in base region
34 OWG in longitudinal direction
35 OWG in transverse direction
36 OWG loop
37 Thermographic image
38 Thermal model
39 Coordinate adjustment
4 Irregularities
41 Overheating
42 Outside water
43 Temperature tolerance band
51 Conduit region (CR)
52 Measurement location 1 in CR
53 Measurement location 2 in CR
54 Measurement location 3 in CR
55 Shaft region (SR)
56 Measurement location 1 in SR
61 OWG cable 62 OWG sensor mat (longitudinal type)
63 OWG sensor mat (transverse type)
64 OWG sensor fiber
65 OWG splice connection
66 Length ratio
67 OWG sensor mat with boot
68 OWG splice cassette
7 Water level

What is claimed is:

1. A method for monitoring a status of a sleeve lining in a pipe or conduit, wherein the sleeve comprises a curable resin, the method comprising the steps of:
    disposing a fiber optic distributed temperature sensing system in thermally conductive contact with the sleeve, wherein the fiber optic sensing system is configured for positionally resolved, distributed temperature sensing to measure the temperature of the sleeve along the length thereof as a continuous profile;
    curing the curable resin over a period of time;
    during the curing act, generating, using the fiber optic sensing system,
    positional and time-related measured data of the temperature thereof;
    wherein the act of generating positional and time-related measured data is performed using the fiber optic distributed temperature sensing system.

2. The method as recited in claim 1, wherein the step of generating positional and time-related measured data is reiterated during the curing act.

3. The method as recited in claim 1, and further comprising a step of repetition of the act of generating positional and time-related measured data of the temperature of the sleeve through operating period of the sleeve.

4. The method as recited in claim 1, and further comprising verification of curing quality of the sleeve following generating linear positional and time-related measured data of the temperature of the sleeve.

5. The method as recited in claim 1, further comprising the step of correlating the positional and time-related data with a thermal model of the curable resin as a function of the degree of curing.

6. The method as recited in claim 1, whereby the positional and time-related measured data can be used to control the energy for the curing process.

7. The method as recited in claim 1, wherein the fiber optic distributed temperature sensing system comprises Raman temperature sensors.

8. The method as recited in claim 1, and further comprising recording positional and time-related measured data of the temperature of the sleeve.

9. The method as recited in claim 8, and further comprising depicting positional and time-related measured data of the temperature of the sleeve.

10. The method as recited in claim 9, wherein the depiction represents positional and time-related measured data of the temperature at a positional resolution below 1 m.

11. The method as recited in claim 9, wherein the depiction of the positional and time-related measured data represents selected positions along the sleeve.

12. The method as recited in claim 9, wherein the depiction of the positional and time-related measured data along the sleeve is a function of time.

13. The method as recited in claim 9, wherein the depiction of the positional and time-related measured data is a 3-dimensional representation.

14. A system configured to monitor a status of a sleeve lining in a pipe or conduit, wherein the sleeve comprises a curable resin, the system comprising:
- a fiber optic distributed temperature sensing system disposed in thermally conductive contact with the sleeve, wherein the fiber optic sensing system is configured for positionally resolved, distributed temperature measurement of the sleeve along the length thereof as a continuous profile;
- a thermal energy source or a light source coupled to the pipe or conduit for curing the curable resin over a period of time; and
- an evaluation apparatus coupled to the fiber optic sensing system and configured to generate, using the fiber optic sensing system, positional and time-related measured data representative of a temperature of the sleeve as a function of linear position along the length thereof and time;
- whereby the fiber optic sensing system comprises at least one optical waveguide.

15. The system as recited in claim 14, wherein the linear positions have a resolution of about 0.5 m to about 1 m along the length of the sleeve.

16. The system as recited in claim 14, wherein the fiber optic distributed temperature sensing system comprises a multimode optical fiber.

17. The system as recited in claim 14, wherein the at least one optical waveguide is embodied as an optical waveguide sensor cable.

18. The system as recited in claim 14, wherein the fiber optic distributed temperature sensing system comprises Raman temperature sensors.

* * * * *